United States Patent [19]

Takahashi et al.

[11] Patent Number: 5,737,956
[45] Date of Patent: Apr. 14, 1998

[54] METHOD FOR MANUFACTURING A FORCE-RECEIVING PLATE FOR FRICTION DEVICE

[75] Inventors: Shigeo Takahashi; Yoshitaka Soga, both of Anjyo; Tatsuo Ohhashi, Ogaki; Hirotaka Ito, Gifu-ken, all of Japan

[73] Assignees: Aisin Seiki Kabushiki Kaisha, Kariya; Marujun Seiki Ind. Co., Ltd., Ogaki, both of Japan

[21] Appl. No.: 763,145

[22] Filed: Dec. 10, 1996

Related U.S. Application Data

[62] Division of Ser. No. 360,575, Dec. 21, 1994, Pat. No. 5,617,941.

[30] Foreign Application Priority Data

Dec. 22, 1993 [JP] Japan ................................ 5-323781
Dec. 22, 1993 [JP] Japan ................................ 5-323782
Dec. 22, 1993 [JP] Japan ................................ 5-323783

[51] Int. Cl.$^6$ ................................................ B21D 53/88
[52] U.S. Cl. ................................................ 72/336; 72/359
[58] Field of Search .......................... 72/336, 335, 359, 72/334; 29/893.34, 893.33

[56] References Cited

U.S. PATENT DOCUMENTS

| 4,727,636 | 3/1988 | Nagano | 29/893.33 |
| 5,029,686 | 7/1991 | Yesnik | 192/70.14 |

FOREIGN PATENT DOCUMENTS

| 2340153 | 9/1977 | France | 72/359 |
| 213325 | 10/1985 | Japan | 29/893.34 |
| 213332 | 10/1985 | Japan | 29/893.34 |
| 274122 | 11/1987 | Japan | . |
| 151339 | 6/1990 | Japan | 29/893.34 |

*Primary Examiner*—Daniel C. Crane
*Attorney, Agent, or Firm*—Burns, Doane, Swecker & Mathis, LLP

[57] ABSTRACT

A pressure-receiving plate for a friction device includes an annular portion and pawls formed integrally on the inner or outer periphery of the annular portion. The annular portion has one side provided with a friction surface which contacts a friction disk engaged with one of a driving member and a driven member, and another side provided with reduced-thickness portions formed by applying crushing work that takes hardness and surface roughness of the friction surface into consideration. The pawls are engaged with the other of the driving member and driven member.

5 Claims, 14 Drawing Sheets

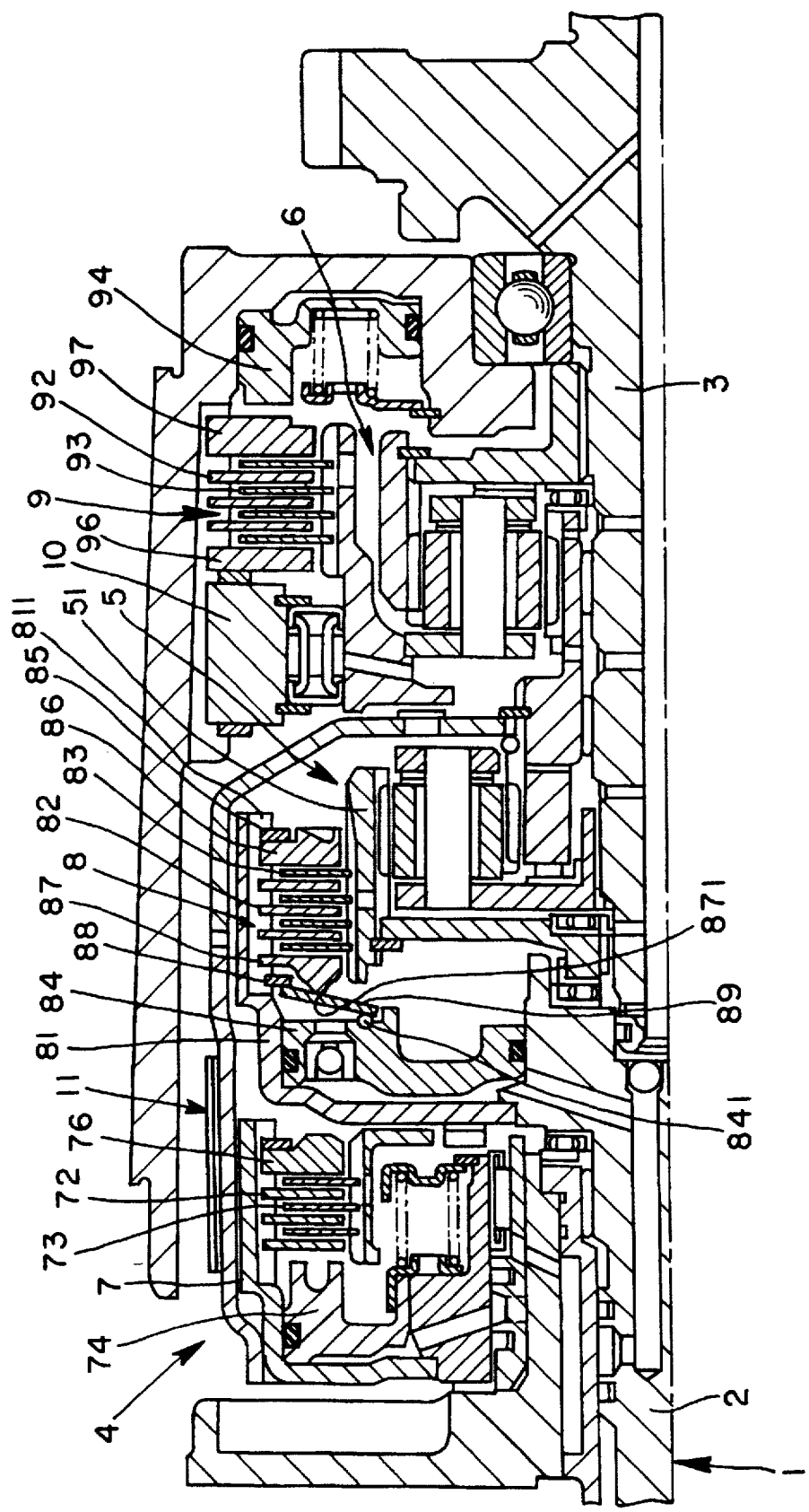

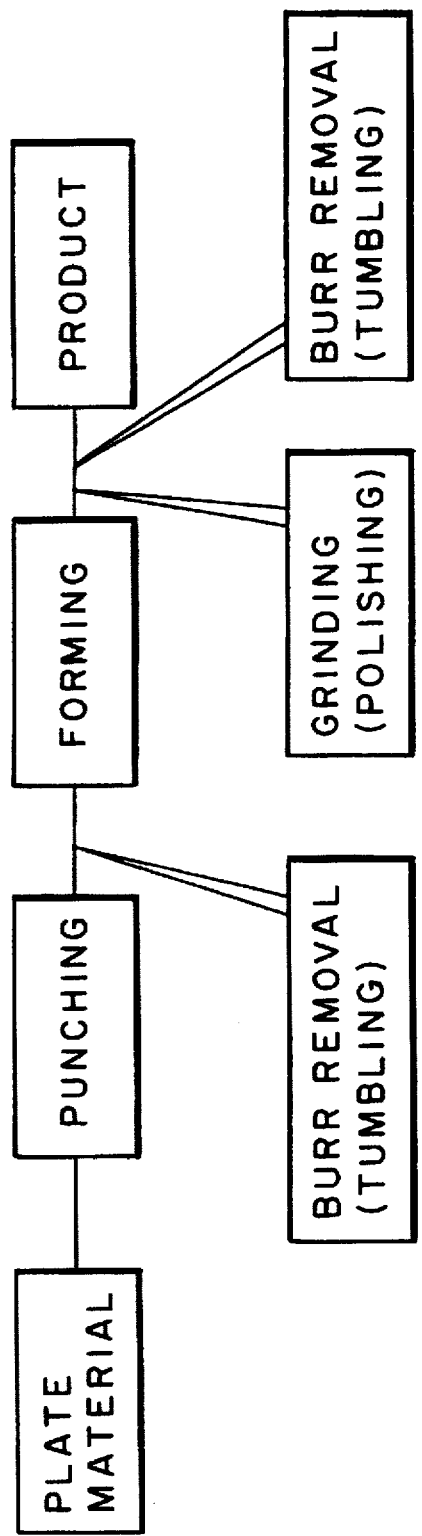

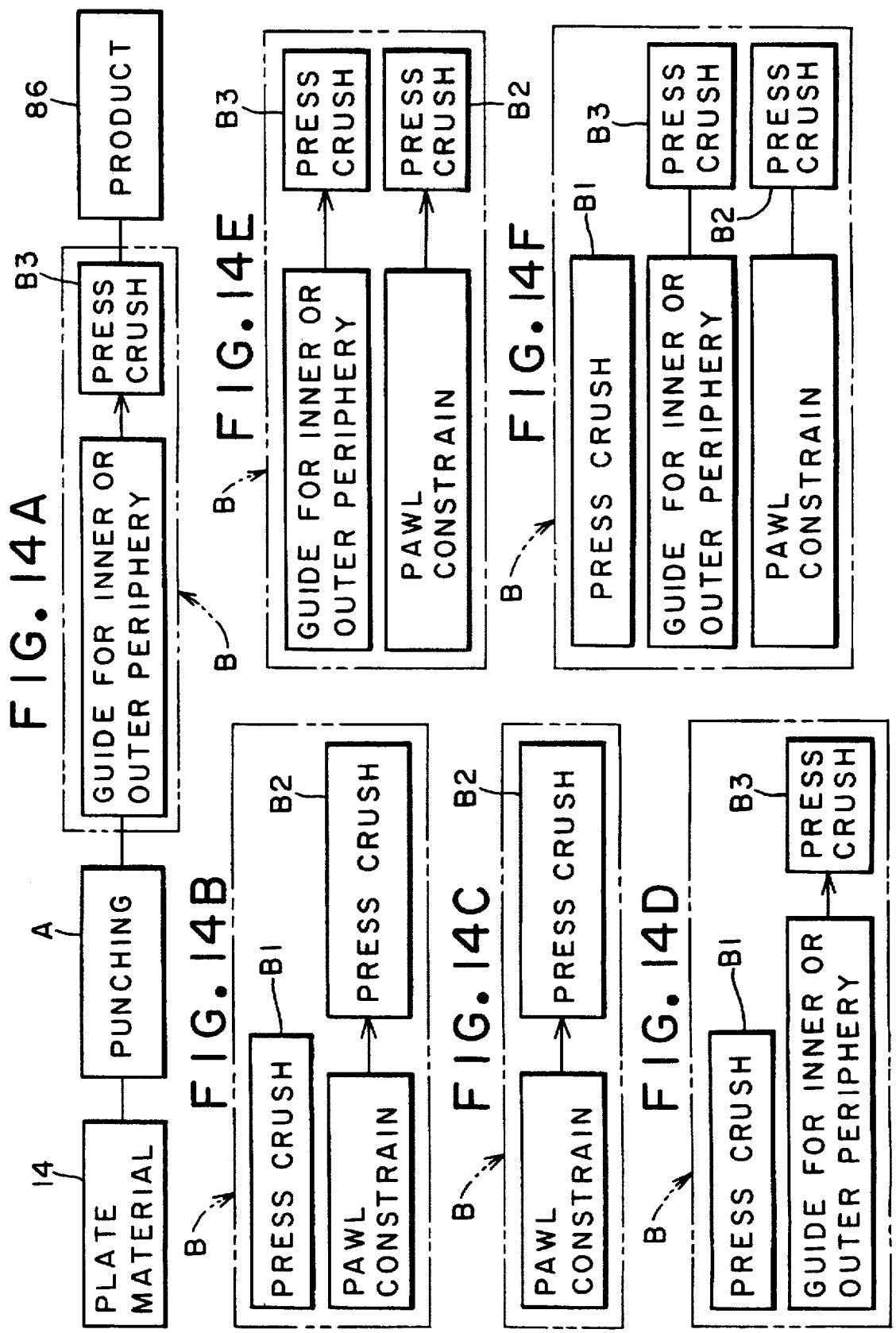

METHOD FOR MANUFACTURING A FORCE-RECEIVING PLATE FOR FRICTION DEVICE

This application is a divisional of application Ser. No. 08/360,575, filed Dec. 21, 1994, now U.S. Pat. No. 5,617,941.

BACKGROUND OF THE INVENTION

1. Field of the Invention

This invention relates to a force-receiving plate for a friction device such as a clutch mechanism.

2. Description of the Prior Art

A known example of force-receiving plate of this type includes an annular portion having a friction surface that contacts a friction disk secured to a driven member and pawl portions formed on the outer periphery of the annular portion for engaging a driving member. The torque of the driving member is transmitted to the driven member via the friction disk by achieving frictional engagement with the friction disk.

In the conventional force-receiving plate, the side opposite that on which the friction surface is formed is provided with reduced-thickness surface portions to avoid interference with other parts, which would otherwise result from the placement of parts within a friction device for an automatic transmission, and to assure the necessary mechanical strength. Examples of this are a force-receiving plate disclosed in the specification of Japanese Patent Publication (KOKOKU) No. 62-274122 and a force-receiving plate disclosed in the specification of Japanese Utility Model Publication (KOKOKU) No. 5-17490. In the former, plate thickness is reduced from a point approximately halfway along the annular portion to the pawls to provide a relief for the plate thickness of a snap ring, which is for engaging the force-receiving plate with a drum of the friction device. In the latter, the arrangement is such that the thrusting force of a piston is received via a saucer-shaped spring. In this arrangement, a portion for receiving the thrusting force is formed and a relief is provided to avoid interference with the saucer-shaped spring. In a further example of a force-receiving plate of a clutch or the like, it has been proposed to provide the side opposite that on which the friction surface is formed be provided with reduced-thickness surface portions or depressions owing to a requirement that the necessary strength be assured while reducing inertial weight. In general, the reduced-thickness surface portions are formed by grinding, which is a very laborious and time-consuming task.

Further, it is requested that the pawl portions of the force-receiving plate has a strength or hardness sufficient to receive a rotational torque from the driving member and the annular portion having the friction surface has a hardness over a predetermined value in view of a friction with the friction disk. In fact, the force-receiving plate is axially thrusted out by a hydraulic piston while receiving the frictional torque through the pawl portions which are arranged in grooves formed on the driving member. As a result, wear of the pawl portions is considerably large. Furthermore, a clearance between each pawl portion and each groove for allowing the force-receiving plate to move along the groove is necessary and hence the pawl portions impact against the side walls of the grooves when the fluctuation of the rotational torque occurs or the rotation of the driving member is reversed. Thus, the pawl portions must have a hardness enough to withstand these phenomenons. To provide the force-receiving plate having sufficient hardness, a normal steel plate material is punched in the form of the force-receiving plate and subsequently such the plate must be subjected to an induction hardening or a caburizing hardening. This results in deformation of the force-receiving plate.

SUMMARY OF THE INVENTION

Accordingly, an object of the present invention is to provide a force-receiving plate having an annular portion in which the necessary mechanical strength is obtained by forming the reduced-thickness surface portions (or depressions) more easily.

Another object of the present invention is to provide a force-receiving plate having a sufficient hardness and also manufactured by reduced laborious task or man hour.

According to the present invention, the foregoing object is attained by providing a pressure-receiving plate for a friction device, said plate comprising an annular portion having one side provided with a friction surface which contacts a friction disk engaged with of a driving member and driven member, and another side provided with a reduced-thickness surface, which is formed by applying crushing work that takes hardness and surface roughness of the friction surface into consideration, and pawls formed integrally on an inner periphery or outer periphery of the annular portion and engaged with the other of the driving member and driven member.

In another aspect of the invention, the foregoing object is attained by providing a pressure-receiving plate for a friction device, said plate comprising an annular portion having one side provided with a friction surface which contacts a friction disk engaged with of a driving member and driven member, and another side provided with a depression, which is formed by applying crushing work that takes hardness and surface roughness of the friction surface into consideration, and pawls formed integrally on an inner periphery or outer periphery of the annular portion and engaged with the other of the driving member and driven member.

Further, there is provided method of manufacturing a pressure-receiving plate for a friction device comprising: a step for punching a starting plate in a shape of blank having an annular portion which contacts a friction disk engaged with one of a driving member and a driven member and pawls extending radially inwardly or outwardly from the annular portion and engaged with the other, and a step for crushing the blank having the predetermined thickness.

In operation, the reduced-surface portions or depressions are formed by crushing work, which requires little labor. As a result, a pressure-receiving plate having an annular portion which provides the required mechanical strength is obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a partial sectional view illustrating a friction device in an automatic transmission which employs a force-receiving plate according to the present invention;

FIG. 6A is a diagram showing the process for manufacturing the force-receiving plate of the present invention;

FIGS. 14A through 14F are diagrams illustrating a seventh modification of the force-receiving plate according to the present invention.

DESCRIPTION OF THE PREFERRED EMBODIMENT

Figure 2A:
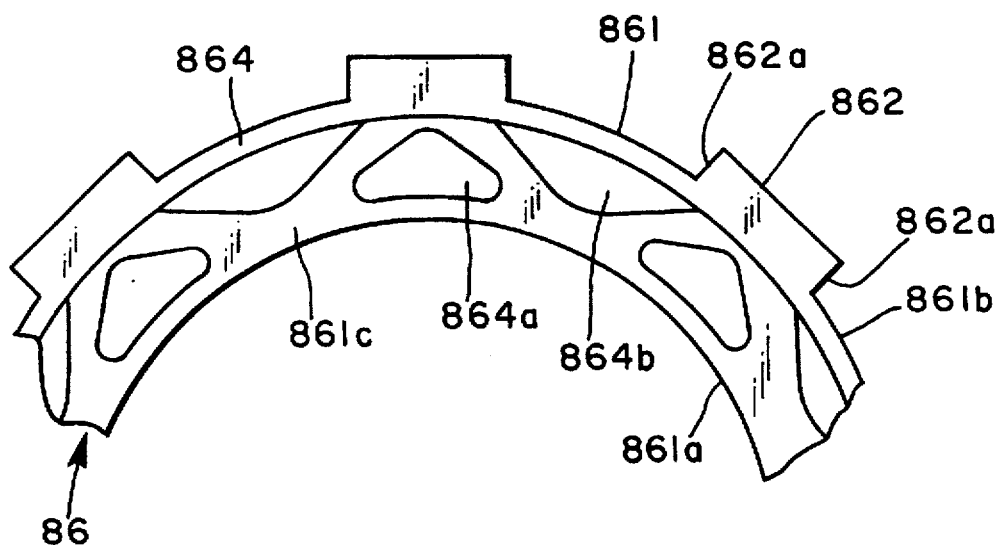
FIGS. 2A, 2B, 2C and 2D are diagrams illustrating an embodiment of the force-receiving plate according to the present invention.

A preferred embodiment of a force-receiving plate assembly according to the present invention will now be described in detail with reference to the accompanying drawings.

FIG. 1 is a partial sectional view illustrating an example of an automatic transmission that employs a friction device having the force-receiving plate according to the present invention. The automatic transmission, indicated at numeral 1, includes an input shaft 2 coupled to a vehicle engine (not shown) via a torque converter (not shown), an output shaft 3 coupled to a differential mechanism (not shown) via a wheel (not shown), and a transmission mechanism 4 coupling the input shaft 2 and the output shaft 3. The transmission mechanism 4 includes front and rear planetary gear mechanisms 5, 6 having sum gears, ring gears and planetary gears, direct and forward clutches 7, 8 and a reverse brake 9 each having a plurality of plates, a plurality of friction disks and a piston, a one-way clutch 10 and a band brake 11. By operating the direct and forward clutches 7, 8, the reverse brake 9, the one-way clutch 10 and the band brake 11 in cooperation to select a locked/rotating relationship among the sun gears, ring gears and planetary gears of the front and rear planetary gear mechanisms 5, 6, rotation of the input shaft 2 is shifted in speed over several stages before being transmitted to the output shaft 3.

The friction device having the force-receiving plate of the present invention will now be described taking the above-mentioned forward clutch 8 as an example.

The principal components of the forward clutch 8 are a plurality of disk plates 82 engaged with and supported on a drum 81 of the forward clutch 8 so as to be free to slide in the axial direction and rotate together with the drum 81, and a plurality of friction disks 83 engaged with and supported on a ring gear 51 of the front planetary gear mechanism 5 so as to be free to slide in the axial direction and rotate together with the ring gear 51. Furthermore, the forward clutch 8 has a hydraulically actuated piston 84 supported on a cylinder portion, which is constructed within the drum 81 by the input shaft 2, so as to slide freely in the axial direction along with a sealing member, and a backing plate 86 engaged with and supported on the drum 81 so as to rotate together with the drum 81, with the movement of the backing plate 86 in the axial direction being limited by a snap ring 85. An annularly or circularly formed pressure plate 87 having a projection 871 is arranged on the side of the piston 84. Disposed between the pressure plate 87 and the piston 84 is a saucer-shaped spring 89 which performs both cushioning and restoring functions. The spring 89, whose movement in the axial direction is limited by the snap ring 88, is supported on the piston 84 in such a manner that its inner peripheral surface contacts a pivot ring 841. When the piston 84 is hydraulically actuated to slide in the axial direction, the pressure plate 87 is urged by the projection 871 via the saucer-shaped spring 89 so that the disk plates 82 and friction disks 83 are made to slide on the side of the backing plate 86. Since the disk plates 82 and friction disks 83 are sandwiched between the pressure plate 87 and the backing plate 86, frictional engagement results. Accordingly, transmission of torque takes place between the drum 81 and the rink gear 51.

The pressure-receiving plate according to the present invention will now be described taking the above-mentioned backing plate 86 as an example.

As shown in FIGS. 2A, 2B, 2C and 2D, the backing plate 86, which consists of a rolled steel plate (e.g., comparatively inexpensive SAPH 440), comprises a unitary body that includes an annular portion 861 having an inner peripheral surface 861a and an outer peripheral surface 861b, and a plurality of pawls 862. The pawls 862 are formed at suitable intervals on the outer peripheral surface 861b of the annular portion 861 and are engaged with a groove 811 (see FIG. 1) formed in the drum 81. As shown in FIGS. 3A through 3F, which illustrate a modification of this embodiment, the pawls 862 may be formed on the inner peripheral surface of the annular portion 861. One side of the annular portion 861 (the surface on the side of the friction disks 83) is formed to have a friction surface 863 that contacts the friction disks 83 (see FIG. 1). The other side of the annular portion 861 (the surface on the side of the snap ring 85) is formed to have a stepped surface 864, which contacts the snap ring 85 (see FIG. 1), extending from the tip of the pawl portions to a point substantially intermediate of the annular portion.

The stepped surface 864 has a step-shaped configuration (see FIG. 2D) produced by a forming process, described later. The step shape has a thickness less than that of the annular portion 861 at the inner periphery thereof thereby providing a space in which the snap ring 85 is placed. It should be noted that the stepped surface 864 may be so adapted that only the pawl portions 862 define the step-shaped configuration.

Figure 2B:
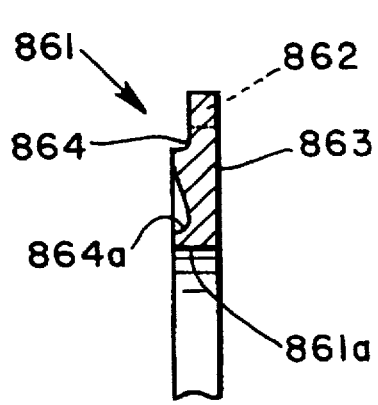
Figure 2D:
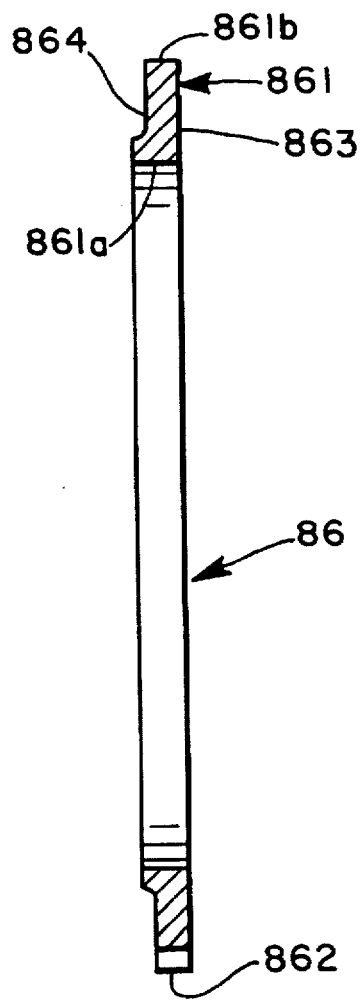
Figure 2C:
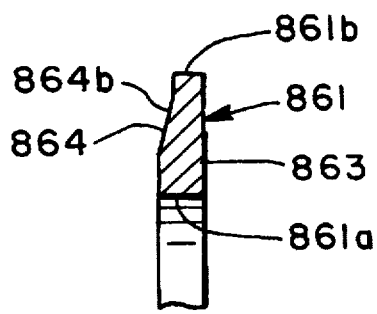

Generally triangular depressions 864a when seen in a plan view, as shown in FIG. 2A, are formed substantially at the middle of the annular portion 861. Each depression 864a has a radially tapering cross section, as depicted in FIG. 2B. Reduced-thickness surfaces 864b, where thickness is reduced gradually in the radial direction as shown in FIG. 2C, are formed between the pawls of the annular portion 861 (in the circumferential direction thereof) over a generally triangular range when viewed in the plan view of FIG. 2A. As a result, thickened portions are formed on the inner circumference of the annular portion 861, and thickened portions 861c are formed in staggered fashion in the circumferential direction. This assures the necessary mechanical strength while reducing the inertial weight.

Figure 3A:
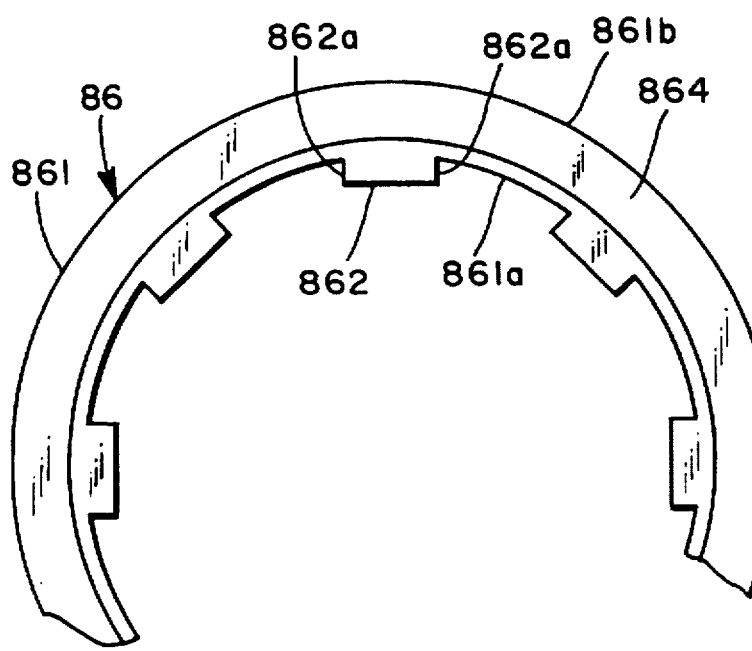
FIGS. 3A through 3F are diagrams illustrating a first modification of the force-receiving plate according to the present invention.
Figure 3B:
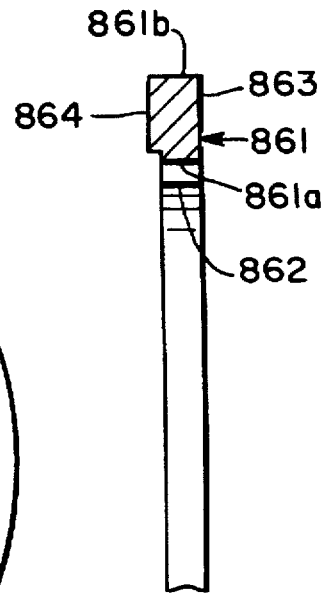
Figure 3C:
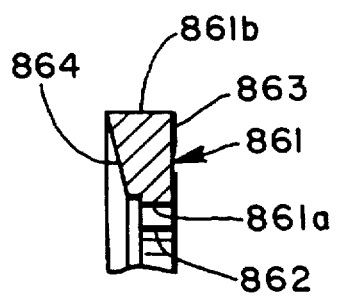
Figure 3D:
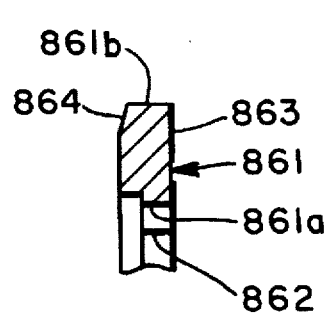
Figure 3F:
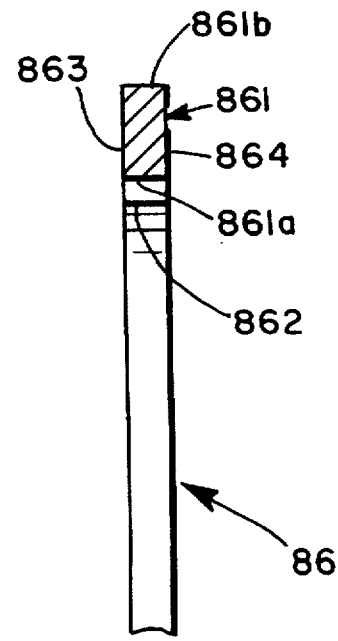
Figure 3E:
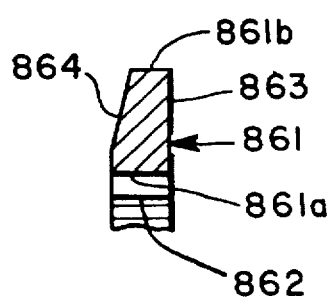

The reduced-thickness surfaces of gradually reduced thickness in the radial direction are for avoiding interference with other parts and, when necessary, may be formed as the in the manner of the stepped surface 864 of FIGS. 3C, 3D and 3F. Further, the shape of the stepped surface 864 may be similar to that of the pressure plate 88 or similar to that of the backing plate 76 of the direct clutch 7, or of the backing plate 96 or pressure plate 97 of the reverse brake 9 (see FIG. 1).

In the backing plate 86 having this construction, at least the pawls 862 are given a hardness (e.g., more than 140 Hv) higher than that of the starting material 14 (the above-mentioned rolled steel of SAPH 440) by the forming process described below. Further, the pawls 862 are given a hardness (e.g., more than 160 Hv) higher than that of the friction surface 863 as required. As a result, the pawls 862 withstand the applied load and bear the thrusting force of the piston 84 when torque is being transmitted from the drum 81 to the ring gear 51. Similarly, the friction surface 863 withstands wear at the time of frictional engagement with the friction disk 83. Both side surfaces 862a of the pawls 862 that engage with the groove 811 can be given a hardness (e.g., more than Hv 170) higher than that of at least the friction surface by the forming process described later. As a result, the pawls 862 are capable of withstanding wear and deformation. Furthermore, the friction surface 863 is given a hardness (e.g., more than 140 Hv) higher than that of the starting material 14 (tha above-mentioned rolled steel plate of SAPH 440) by the forming process described below, as well as a surface roughness (e.g., less than 2 Z) finer than that of the starting material. As a result, the friction surface is capable of offering appropriate frictional engagement for rotating the drum 81 and backing plate 86 in unison.

An example of an apparatus for manufacturing the backing plate 86 will now be described.

Figure 4:
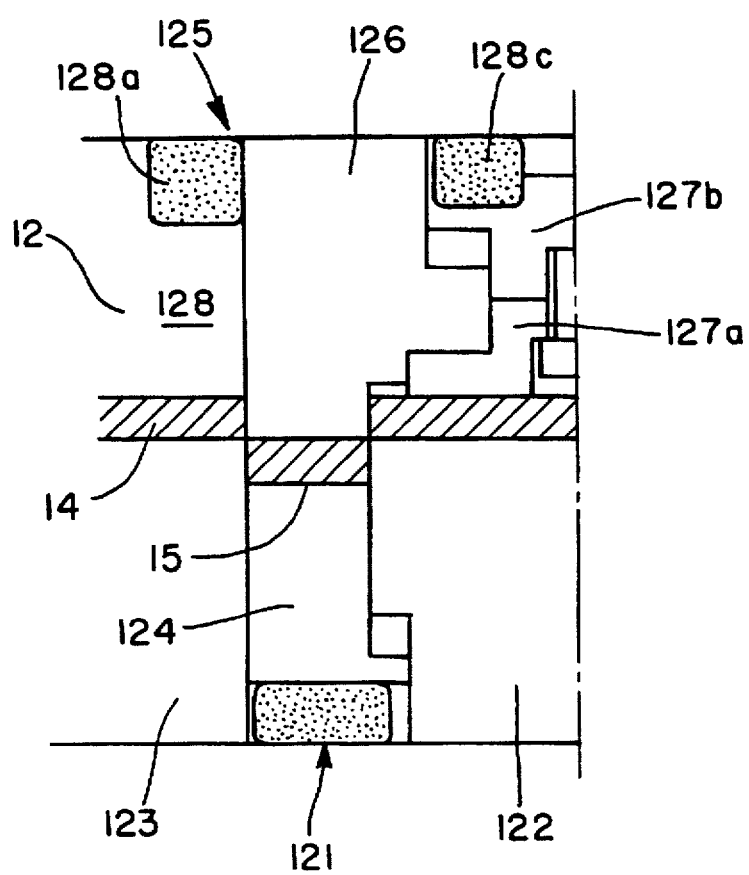
FIG. 4 is a sectional view illustrating a manufacturing apparatus used in the punching process of the force-receiving plate of the present invention.
Figure 5:
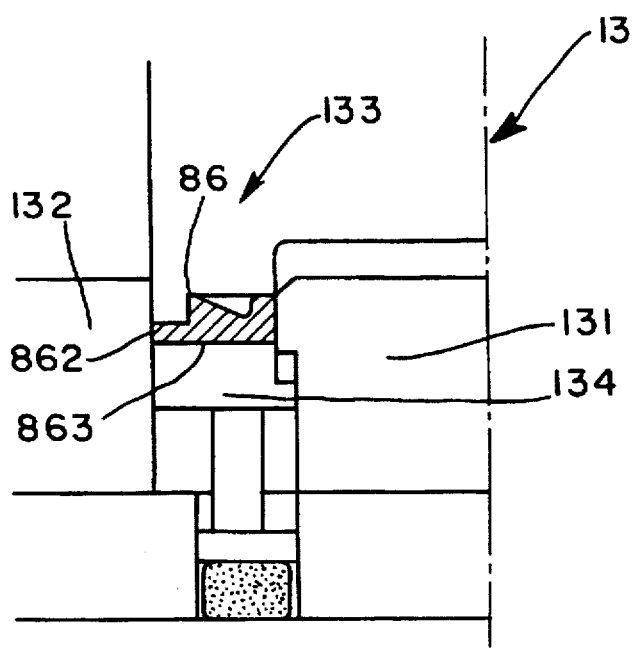
FIG. 5 is a sectional view illustrating a manufacturing apparatus used in the forming of the force-receiving plate of the present invention.

FIG. 4 shows an apparatus 12 for manufacturing a blank 15, which is a unitary body having the annular portion 861 and pawls 862 (see FIGS. 2A–2D and 3A–3F), from the starting material 14, and FIG. 5 illustrates an apparatus 13 for manufacturing the backing plate 86 from the blank 15 by giving the friction surface 863, the pawls 862 and both side surfaces 862a of the pawls 862 a desired hardness, providing the friction surface 863 with the desired surface roughness, forming the friction surface 863 and bringing plate thickness and overall shape into conformity.

As shown in FIG. 4, the manufacturing apparatus 12 is a punching die arranged on, say, a 200–300 ton knuckle-joint press. Pressing members 128, 127a, 127b for urging the starting material 14 against dies 123, 122 installed on a lower die base 121 are incorporated in an upper die base 125 via respective cushions 128a, 128c. The apparatus further includes a punch 126 for pressing the starting material 14, a knock-out 124 for detaching the blank 15, which has been punched from the starting material 14 by the punch 126, from the dies 123, 122, and a cushion 124a. The knock-out 124 is arranged so as to be free to move up and down relative to the dies 123, 122. The pressing surface of the punch 126 has a shape that forms the blank 15. The cushions 124a, 128a, 128c usually are made of urethane and employ elastic force. However, it is permissible to use hydraulic pressure, pneumatic pressure, etc.

As shown in FIG. 5, the manufacturing apparatus 13 is a stamper die arranged on, say, an 800–1000 ton knuckle-joint press and includes a center guide 131 for guiding the inner circumference of the annular portion 861, a die 132 for restraining the periphery of the pawls 862 and guiding the outer periphery of the pawls 862 and the circumference of the annular portion 861, a punch 133 for pressing the other side of the annular portion 861, and knock-out 134 for receiving one side of the annular portion 861 and detaching the backing plate 86, which has been formed from the blank 15 by the punch 133, from the center guide 131 and die 132. The punch 133 and knock-out 134 are so arranged as to be freely movable up and down relative to the center guide 131 and die 132. The pressing surface of the punch 133 (namely the lower side in the Figure) has the shape which defines the stepped surface 864, and the seating surface of the knock-out (namely the upper side in the Figure) has the shape which forms the friction surface 863.

Figure 6B:
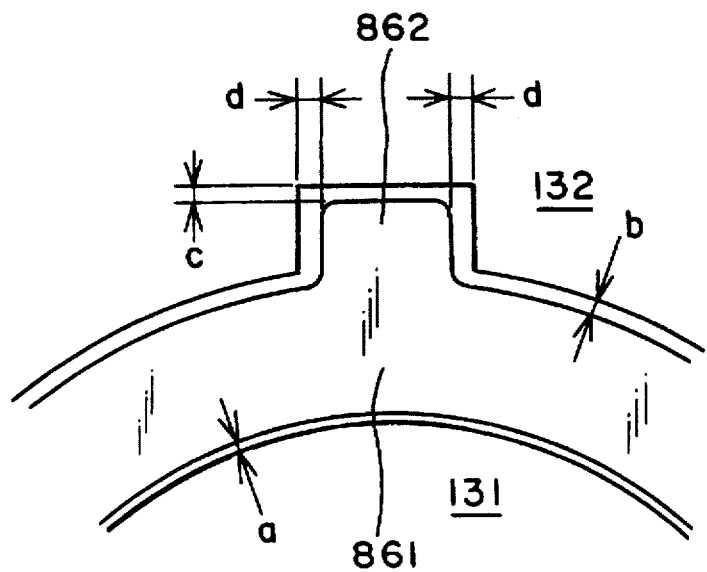
FIGS. 6B and 6C are diagrams showing dimentional relation between the force-receiving plate and die.
Figure 6C:
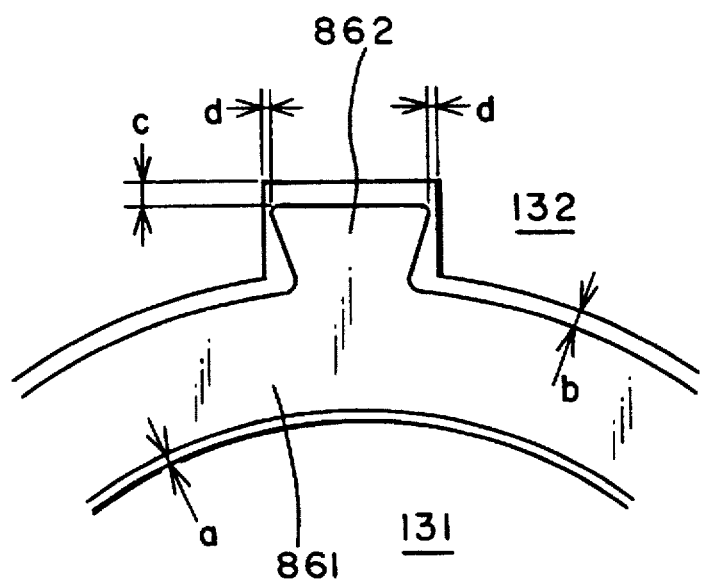

As shown in FIG. 6, the starting material 14 is set in the manufacturing apparatus 12 and the latter is placed in operation, whereupon the punch 126 is lowered to punch the starting material 14. As a result, the blank 15 is manufactured from the starting material 14. This is a punching step. At this time sag formed on the inner and outer peripheries of the annular portion 861 and on the periphery of the pawls 862 is produced solely on the side of the annular portion 861. Next, the blank 16 is set in the manufacturing apparatus 13, which is then placed in operation. When this is done, the punch 133 is lowered toward the knock-out 134 so that the side of the annular portion 861 is crushed to have a prescribed crush relief. As a result, the backing plate 86, whose plate thickness and overall shape are in conformity, and which is formed to have the stepped surface 864, is formed from the blank 15. This is the forming process.

In the forming process, a gap (see FIGS. 6B and 6C) of prescribed dimensions is established between the blank 15 and the center guide 131 and die 132. By virtue of the presence of the gap, the portion crushed by the crushing of the blank 15 is deformed so as to fill the gap. As a result, the hardness of at least the friction surface 863, the pawls 862 and both side surfaces 862a of the pawls 862 are raised to a desired hardness, and the friction surface 863 is given the desired surface roughness (the pawls 862 and the friction surface 863 are formed). The dimensions of the gap are set on the basis of the constraint relief with respect to the crush relief. The constraint relief indicates the volume ratio between the die 132 and the blank 15. This represents the amount by which the blank 15 is made to approach the die 132 while holding the crush margin fixed, with state which coincides with the mold dimensions of the die 132 when the blank is crushed at the prescribed crush relief being taken as a reference (0).

For example, the dimensions of the gap ($a < b \leq c < d$) (see FIGS. 6B and 6C) are set as follows. When the blank plate 15 having an inner diameter of 80–160 mm, an outer diameter of 105–160 mm, and a plate thickness of 3–5 mm is to be used, the size of a is less than 0.05 mm and the dimensions b, c and d are set on the basis of the constraint relief with respect to the crush relief.

Figure 7A:
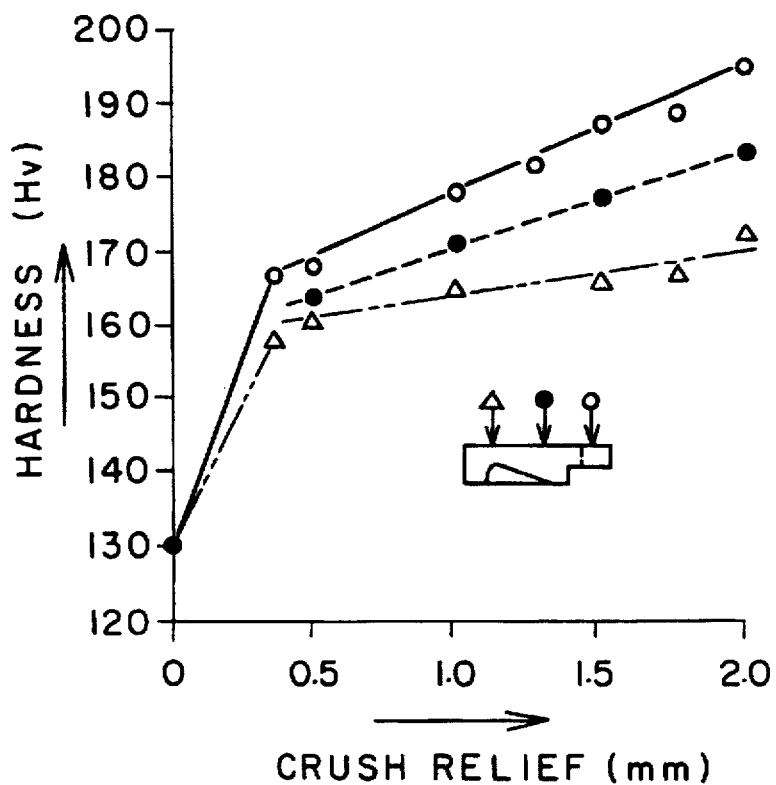
FIGS. 7A and 7B are graphs illustrating the relationship between the hardness and crush relief of the force-receiving plate according to the present invention.
Figure 7B:
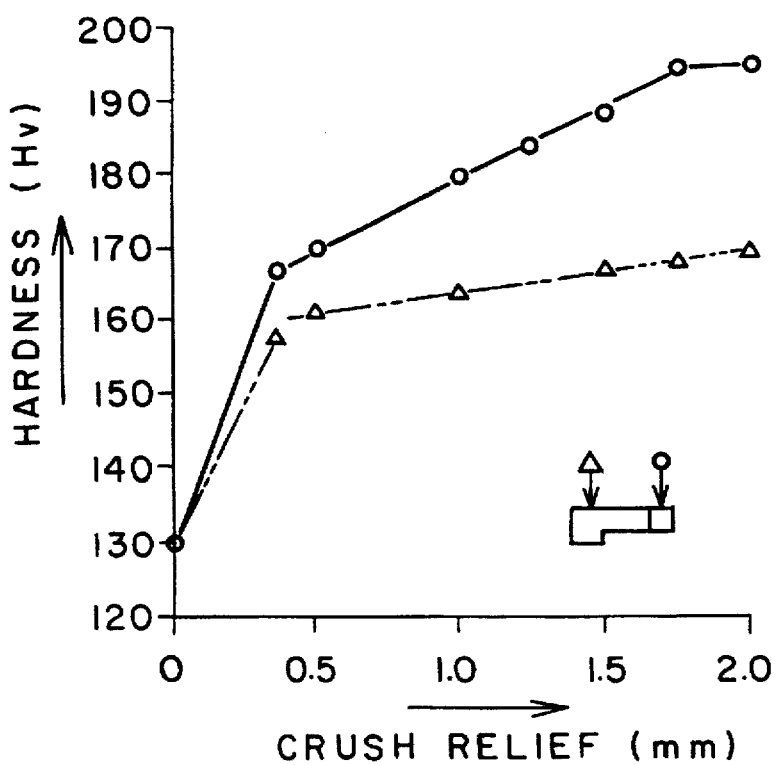

FIGS. 7A and 7B illustrate the relationship between crush relief and the hardnesses of the friction surface 863 and pawls 862 when the forming process is applied to the blank 15 having an inner diameter of 80 mm, an outer diameter of 100 mm and a plate thickness of 4.5~5 mm, with the blank being formed from the starting material 14 of SAPH 440. It will be understood that the desired hardness (e.g., a hardness of more that Hv 140) of the friction surface 863 and pawls 862 is obtained at a crush relief of more than 0.1 mm.

Figure 8A:
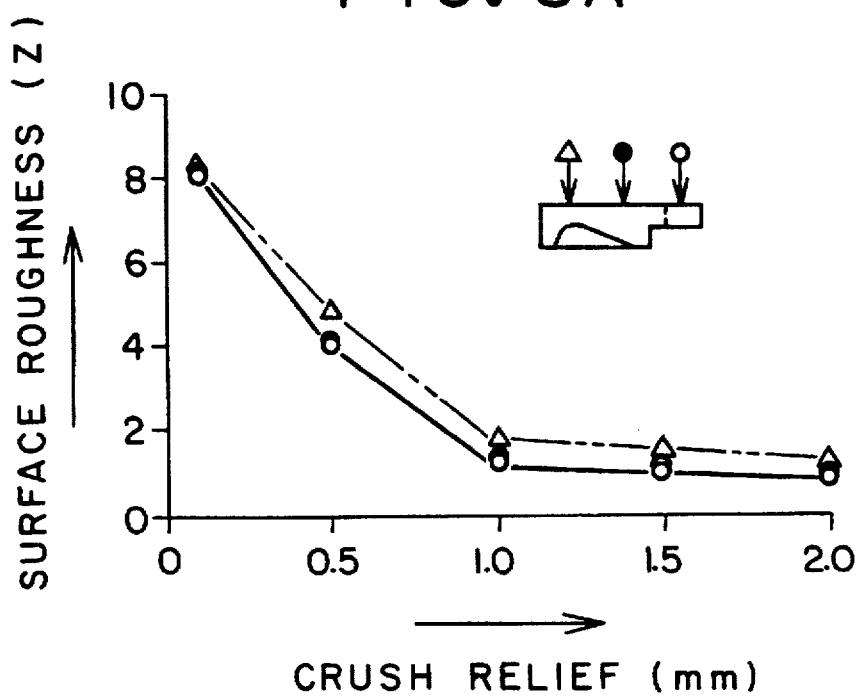
FIGS. 8A and 8B are graphs illustrating the relationship between surface roughness and crush relief of the force-receiving plate according to the present invention.
Figure 8B:
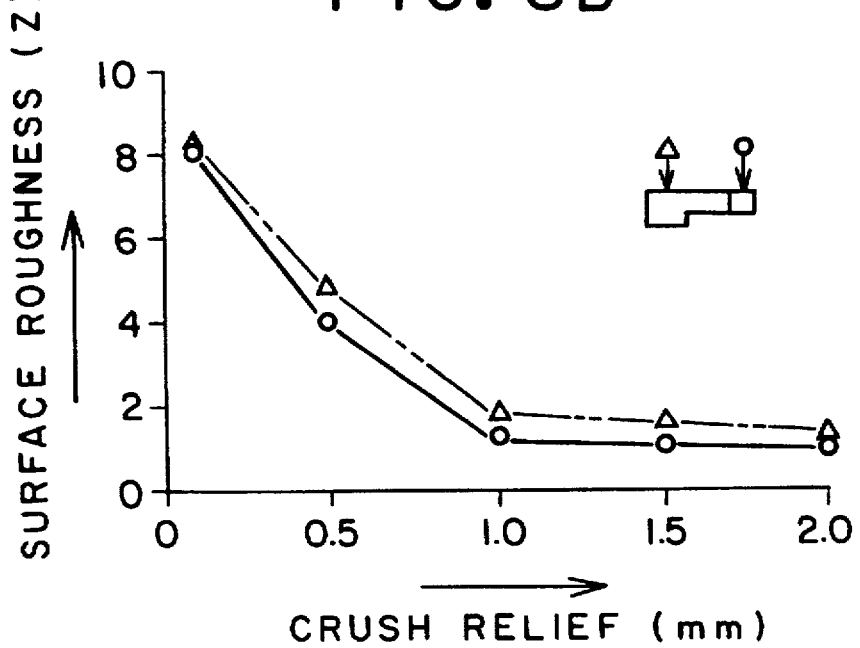

FIGS. 8A and 8B show the relationship between the crush relief and surface roughness of the friction surface 863 when the forming process is applied to the above-mentioned blank 15. It will be understood that the desired surface roughness (e.g., 2 Z) of the friction surface 863 is obtained at a crush relief of more than 1.0 mm. Accordingly, the desired hardness of the pawls 862 and friction surface 863 and the desired surface roughness of the friction surface 863 are obtained by making the crush relief more than 1.0 mm.

Figure 8C:
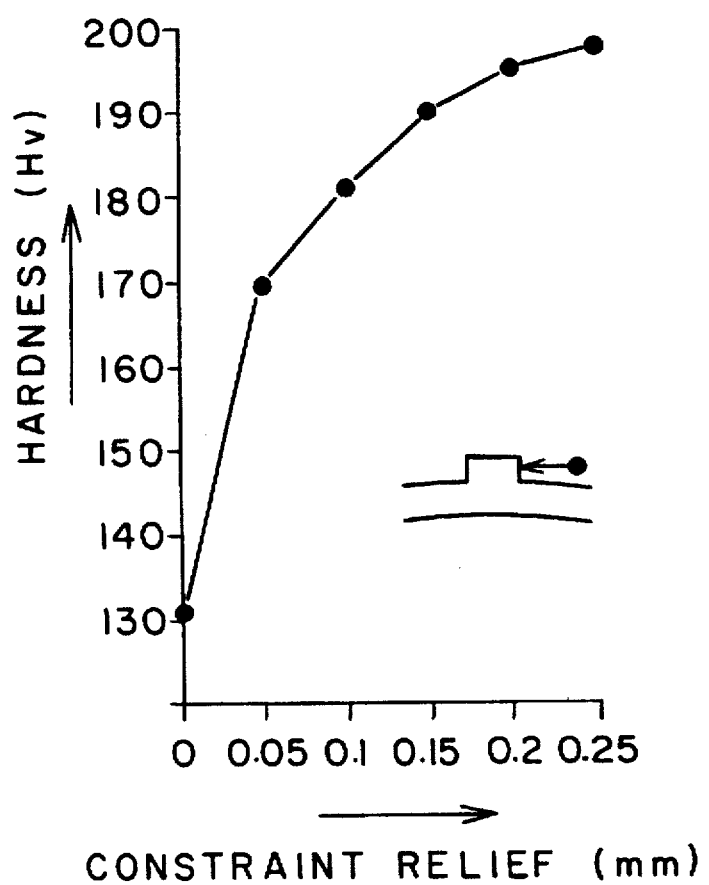
FIG. 8C is a diagram illustrating the relationship between the hardness and constrained relief of the force-receiving plate according to the present invention.

As shown in FIG. 8C, the relationship between the constraint relief and hardness of both side surfaces of the pawls 862 in a case where the blank 15 is subjected to the forming process is such that the desired hardness (e.g., Hv 170) of both side surfaces of the pawls 862 is obtained by making the constraint relief more than 0.05 mm.

It should be noted that a tumbling step for removing burrs and the like may be introduced as needed between the punching and forming steps or after the forming step. Further, a polishing step for finishing the friction surface 863 may be introduced as needed after the forming step.

For example, the product wherein the thickness of the pawl 862 is the same as that of the annular portion 861 and the blank of SAPH 440 steel plate has the inner diameter of about 100 mm, the outer diameter of about 130 mm, the pawl width of about 16 mm, and the thickness of 4.0 mm is produced. This product has a frictional surface hardness of HV 140 or more, a surface roughness (frictional surface) of 1.6 Z or less and the test results of this product were excellent for the backing plate (see FIGS. 8A and 8B).

Another embodiments of the invention will now be described.

Figure 9A:
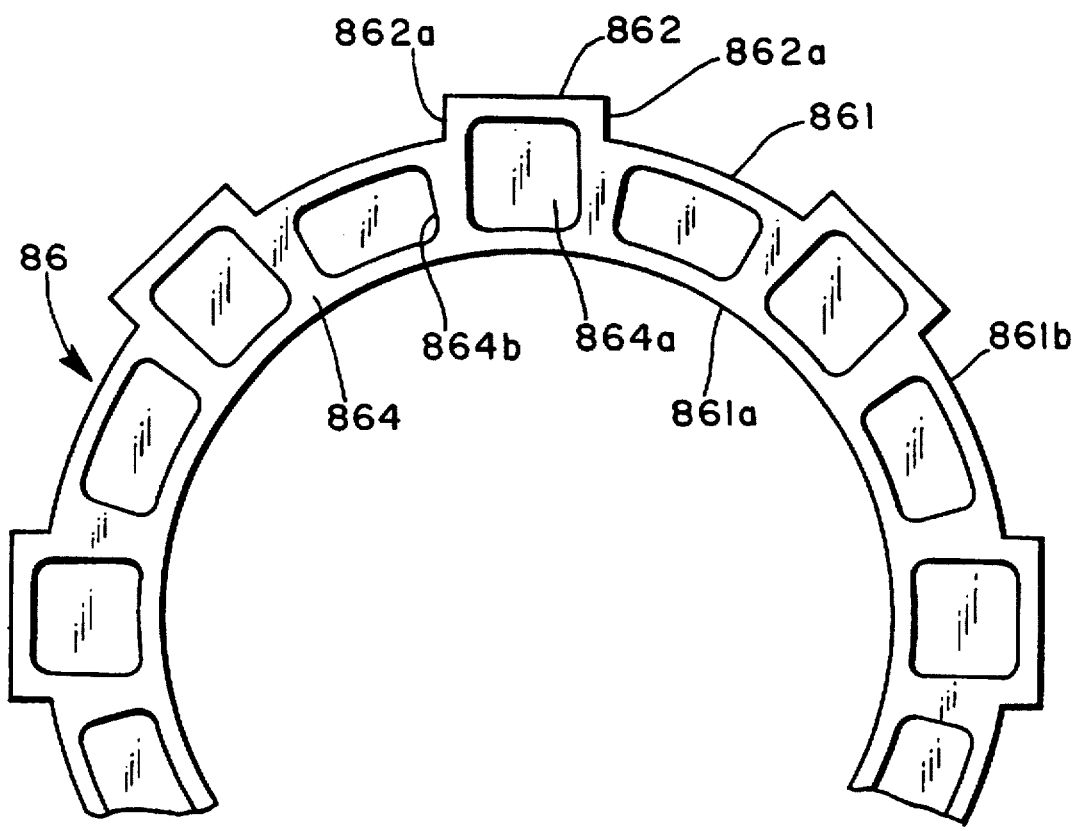
FIGS. 9A through 9C are diagrams illustrating a second modification of the force-receiving plate according to the present invention.
Figure 9B:
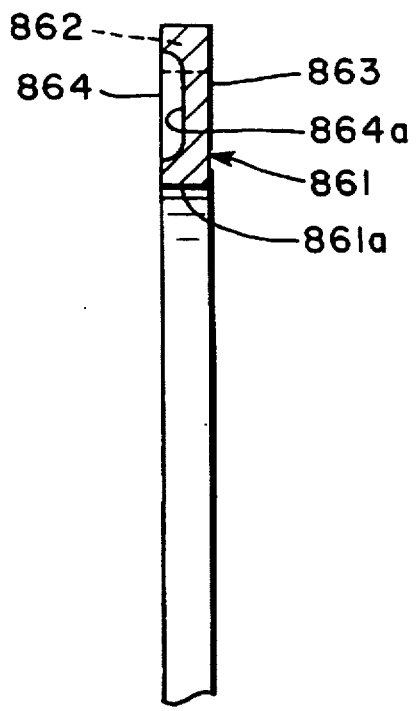
Figure 9C:
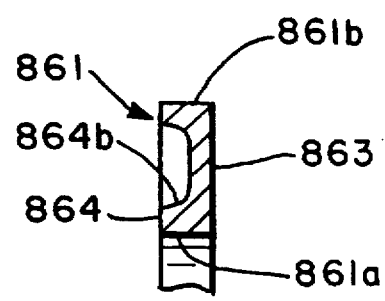
Figure 10A:
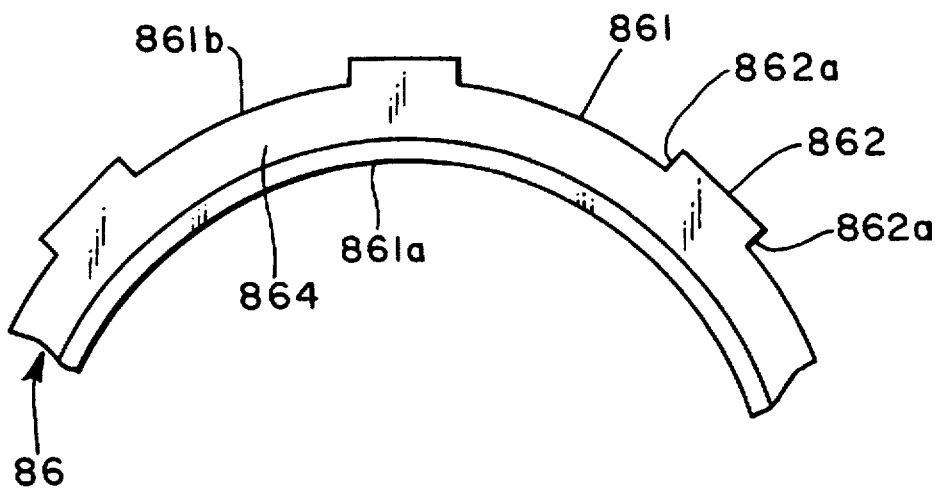
FIGS. 10A through 10E are diagrams illustrating a third modification of the force-receiving plate according to the present invention.
Figure 10B:
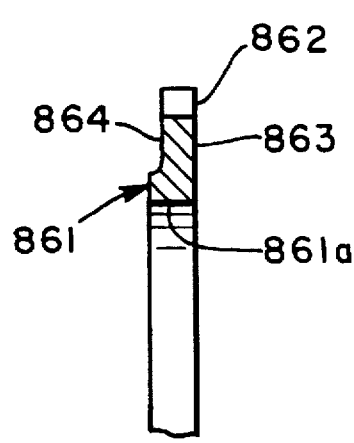
Figure 10C:
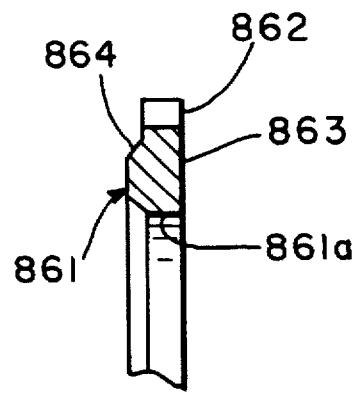
Figure 10D:
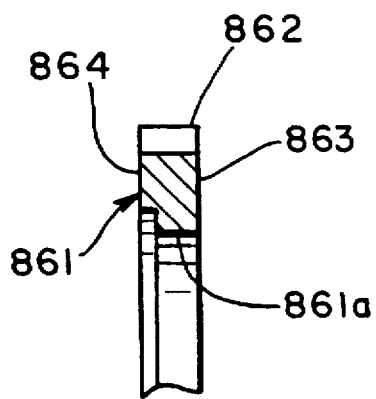
Figure 10E:
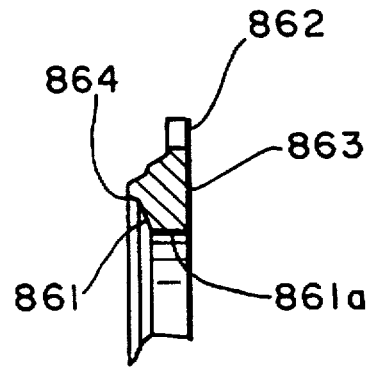
Figure 11A:
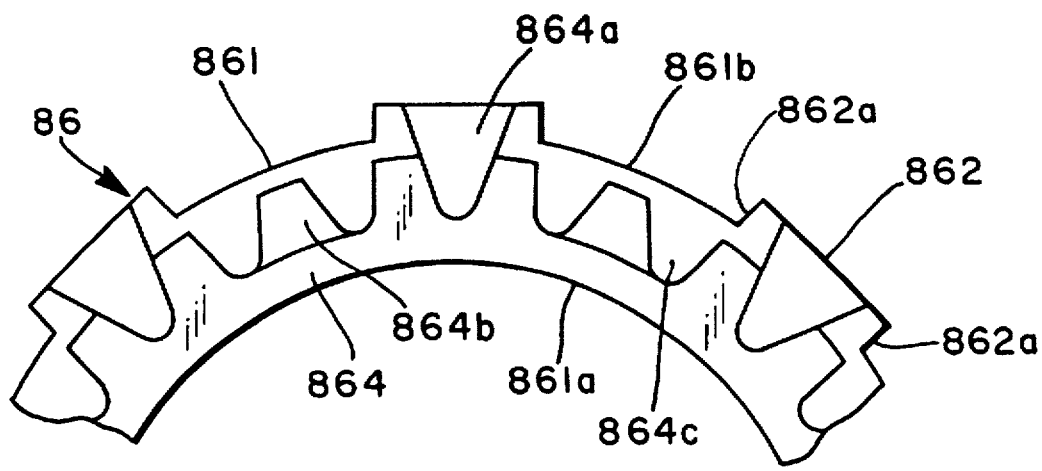
FIGS. 11A through 11D are diagrams illustrating a fourth modification of the force-receiving plate according to the present invention.
Figure 11B:
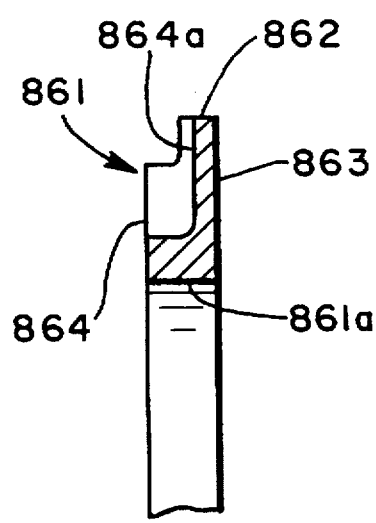
Figure 11C:
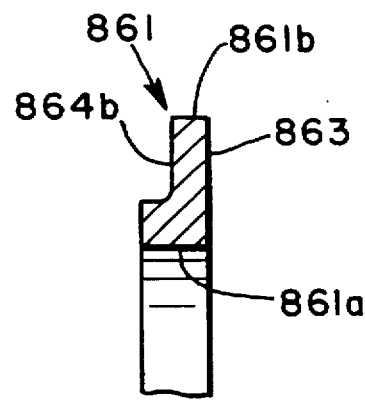
Figure 11D:
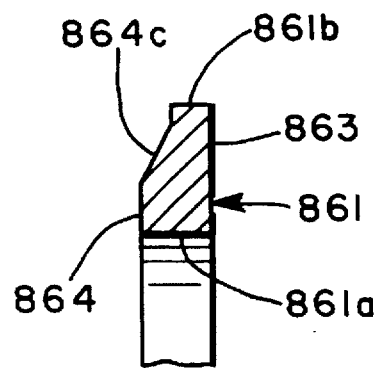

FIGS. 9A, 9B, 9C show an example of the stepped surface 864 formed by applying crushing work to the blank 15 of approximately uniform thickness upon taking into account the hardness and surface roughness of the friction surface 863 on the other side of the annular portion 861. Generally rectangular depressions 864a, 864b of planar shape, as shown in FIG. 9A, are formed to have thickness portions defined by the inner and outer circumferences and the radially directed portions of the contours of the pawls. The cross-sectional shape is as illustrated in FIGS. 9B, 9C. This configuration results in lighter weight while assuring the necessary mechanical strength.

FIGS. 10a, 10b, 10c, 10d and 10e show an example of the stepped surface 864 formed by applying crushing work to the blank 15 of approximately uniform thickness upon taking into account the hardness and surface roughness of the friction surface 863 on the other side of the annular portion 861. This shape corresponds to the backing plate 86, pressure plate 87 and pressure plate 97 of FIG. 1. The arrangement assures the necessary mechanical strength and makes it possible to avoid interference with other parts.

FIGS. 11A through 11D show a further example of the stepped surface 864 formed by applying crushing work to the blank 15 of approximately uniform thickness upon taking into account the hardness and surface roughness of the friction surface 863 on the other side of the annular portion 861. The portion of the pawls 862 is formed to have a V-shaped, comparatively narrow reduced-thickness portion 864a (see FIG. 11B). The generally annular portion between pawls (in the circumferential direction) is made a reduced-thickness surface 864b (see FIG. 11C) and the approximate midpoint (in the circumferential direction) of the generally annular portion is made a reduced-thickness surface 864c (see FIG. 11D), which is partially inclined toward the outer circumference from the stepped surface 864. A V-shaped reduced-thickness surface is formed radially when seen in the plan view of FIG. 11A. As a result, with regard to the pawls 862, these are thinner in comparison with the annular portion 861, but the thickness on the side surface is sufficiently large to withstand surface pressure.

In a case where the seating surface for a snap ring or the like is taken into consideration, this is provided by the reduced-thickness surface 864b of the generally annular portion. With respect to bending of the pawls 862 (in a case where an urging force acts upon the friction surface 863), the reduced-thickness portion of the stepped surface 864 extends to the root of the pawls 862 (see FIGS. 11A, 11B) and possesses sufficient strength. By adopting a pressure-receiving plate having a shape such as this, the hardness of the friction surface 863 is raised, inertial weight is reduced while assuring surface roughness of the friction surface 863 and the required necessary strength is assured.

Figure 12A:
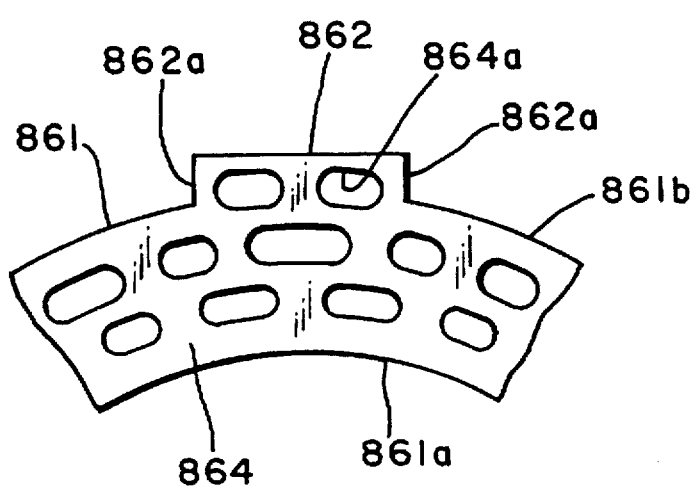
FIGS. 12A and 12B are diagrams illustrating a fifth modification of the force-receiving plate according to the present invention.
Figure 12B:
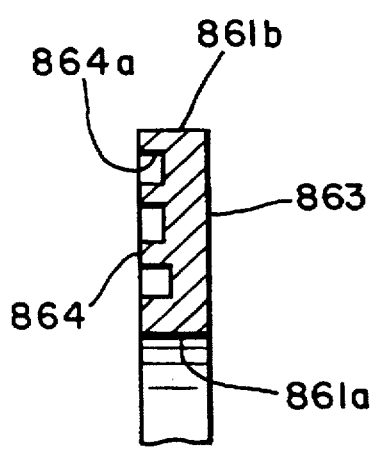
Figure 13:
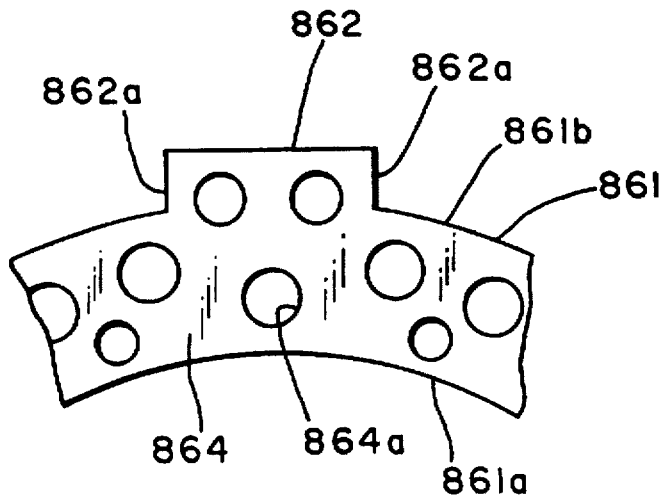
FIG. 13 is a diagram illustrating a sixth modification of the force-receiving plate according to the present invention.

FIGS. 12A, 12B and FIG. 13 show further examples of the stepped surface 864 formed by applying crushing work to the blank 15 of approximately uniform thickness upon taking into account the hardness and surface roughness of the friction surface 863 on the other side of the annular portion 861. Here a number of the depressions 864a are formed in the other side-of general uniform thickness by crushing work. The depressions 864a are generally rectangular in shape, as shown in FIG. 12A, and have an area, arrangement and depth set as required. For example, it is permissible to change these values upon taking into account the hardness and surface-roughness distribution of the friction surface 863.

Further, the shape of the depressions 864a may be circular, as depicted in FIG. 13, triangular (not shown) or another other shape as needed. The depressions 864a shown in FIG. 13 are not limited to a columnar shape but can be spherical.

In FIG. 6 the embodiment of the process to provide the friction surface 863 having the desired surface roughness and the pawl 862 having the desired hardness and surface roughness is illustrated in which one press-crushing step is done in the forming station. FIG. 14A through 14F shows further examples of process for manufacturing the force receiving plate. The forming station B contains at least a press-crushing step B3 for obtaining the pawls 862 having the desired surface roughness, a press-crushing step B2 for obtaining the pawls 862 having the desired hardness on its both sides, or a press-crushing step B1 for obtaining the friction surface 863 having the desired surface roughness and hardness. Example of FIG. 14A has the press-crushing step B3 and FIG. 14B has the steps B1 and B2. FIG. 12C has the step B2 and FIG. 14D has the steps B1 and B3. FIG. 14E has the steps B2 and B3 and an example of FIG. 14F has the steps B1, B2 and B3. Each steps can be individually performed and also can be performed in one process.

Thus, as described above, the stepped surface 864 is formed by applying crushing work and, at the same time, the hardness of the pawls 862 and friction surface 863 is raised and the surface roughness of the friction surface 863 is improved. Accordingly, a shape which avoids interference with other parts or a shape which provides lighter weight while taking mechanical strength into consideration can be formed with ease, and the amount of labor involved is reduced in comparison with the prior art. Moreover, since the crushing work is applied to the other side of the annular portion 861 where sag occurs when the blank 15 is formed, the sag can be corrected by the crushing work. As a result, labor is reduced in comparison with the prior art. Moreover, the crushing work is applied in the forming process. In a case where the pawls 862 are constrained by the die 132 in the forming process, plate thickness and overall shape are brought into conformity and the hardness of the pawls 862 is raised by applying crushing work. In particular, the hardness of both side surfaces of the pawls 862 is raised.

Thus, labor is reduced in comparison with the prior art. Accordingly, the number of process steps can be reduced greatly in comparison with the prior art and the manufacturing process of the backing plate 86 is simplified.

Thus, in accordance with the present invention, a reduced-thickness surface or depression is formed by press machining, which does not require much labor. As a result, it is possible to provide a pressure-receiving plate having reduced-thickness surfaces or depressions formed more easily. This can be achieved while maintaining the required strength of the annular portion. Moreover, flatness and surface roughness of the friction surface on the annular portion can be maintained at a high level of accuracy.

As many apparently widely different embodiments of the present invention can be made without departing from the spirit and scope thereof, it is to be understood that the invention is not limited to the specific embodiments thereof except as defined in the appended claims.

What is claimed is:

1. A method of manufacturing a pressure receiving plate for a friction device comprising:

punching a starting plate in a shape of blank having an annular portion for contacting a friction disk engaged with one of a driving member and a driven member, and pawls extending radially inwardly or outwardly from the annular portion for engaging the other of the driving member and the driven member, the annular portion having an inner periphery and an outer periphery, and a forming step that includes placing the blank in an apparatus with one of the inner and outer peripheries of the annular portion serving as a guide for the blank the blank being placed in the apparatus so that a first gap exists between the inner periphery of the annular portion and a guide and a second gap exists between the outer periphery of the annular portion and a die with the second gap having a width greater than the width of the first gap the forming step also including crushing the blank in a range of predetermined crush relief so that a portion of the blank that is crushed at least partially fills the first and second gaps.

2. The method according to claim 1, wherein the step of crushing is performed in such a way that the pawls are constrained.

3. The method according to claim 2, wherein the pressure receiving plate is formed so that the thickness of the pawls is less than the thickness of the annular portion.

4. A method of manufacturing a pressure receiving plate for a friction device comprising:

punching a starting plate in a shape of blank having an annular portion for contacting a friction disk engaged with one of a driving member and a driven member, and pawls extending radially inwardly or outwardly from the annular portion for engaging the other of the driving member and the driven member, and a forming step that includes a step of receiving one side of the annular portion and a step of crushing the blank in a range of predetermined crush relief, with one of the inner and outer peripheries of the annular portion being used as a guide for the blank the pressure receiving plate being formed so that the thickness of the pawls is less than the thickness of the annular portion and so that the hardness of the pawls is greater than the hardness of the annular portion.

5. A method of manufacturing a pressure receiving plate for a friction device comprising:

punching a starting plate in a shape of blank having an annular portion for contacting a friction disk engaged with one of a driving member and a driven member, and pawls extending radially inwardly or outwardly from the annular portion for engaging the other of the driving member and the driven member, and a forming step that includes a step of receiving one side of the annular portion and a step of crushing the blank in a range of predetermined crush relief with one of the inner and outer peripheries of the annular portion being used as a guide for the blank, the pressure receiving plate being formed so that the thickness of the pawls is less than the thickness of the annular portion and so that the hardness of the pawls is greater than the hardness of the annular portion, the crush relief being 1.00 mm or more in size.

* * * * *